US011828838B2

(12) United States Patent
Lee et al.

(10) Patent No.: US 11,828,838 B2
(45) Date of Patent: Nov. 28, 2023

(54) RADAR APPARATUS AND METHOD FOR DETECTING OBJECT BASED ON OCCURRENCE OF EVENT

(71) Applicant: BITSENSING INC., Seoul (KR)

(72) Inventors: Jae Eun Lee, Seoul (KR); Hae Seung Lim, Seongnam-si (KR)

(73) Assignee: BITSENSING INC., Seoul (KR)

( * ) Notice: Subject to any disclaimer, the term of this patent is extended or adjusted under 35 U.S.C. 154(b) by 333 days.

(21) Appl. No.: 17/139,189

(22) Filed: Dec. 31, 2020

(65) Prior Publication Data

US 2022/0206135 A1 Jun. 30, 2022

(30) Foreign Application Priority Data

Dec. 28, 2020 (KR) .................. 10-2020-0184951

(51) Int. Cl.
*G01S 13/56* (2006.01)
*G01S 13/931* (2020.01)
*G01S 7/41* (2006.01)

(52) U.S. Cl.
CPC .............. *G01S 13/56* (2013.01); *G01S 7/415* (2013.01); *G01S 13/931* (2013.01); *G01S 2013/932* (2020.01); *G01S 2013/93271* (2020.01)

(58) Field of Classification Search
CPC ........ G01S 13/56; G01S 7/415; G01S 13/931; G01S 2013/932; G01S 2013/93271
See application file for complete search history.

(56) References Cited

U.S. PATENT DOCUMENTS

| 2007/0216568 | A1* | 9/2007 | Kunert ..................... G01S 13/34 342/107 |
| 2012/0242972 | A1* | 9/2012 | Wee ........................ G01S 17/931 356/4.01 |
| 2016/0061936 | A1* | 3/2016 | Schmalenberg ........ G01S 13/42 342/81 |
| 2019/0137601 | A1* | 5/2019 | Driscoll ................. G01S 13/931 |
| 2019/0212438 | A1* | 7/2019 | Kim ........................ G01S 7/411 |
| 2021/0003691 | A1* | 1/2021 | Zaidi ..................... G01S 13/426 |

FOREIGN PATENT DOCUMENTS

| KR | 100951529 B1 | 4/2010 |
| KR | 1020190101459 A | 8/2019 |
| KR | 1020200056976 A | 5/2020 |

* cited by examiner

*Primary Examiner* — Donald H B Braswell
(74) *Attorney, Agent, or Firm* — Dinsmore & Shohl LLP; Yongsok Choi, Esq.

(57) ABSTRACT

An object detection radar apparatus is installed in a vehicle and is configured to detect an object. The object detection radar apparatus includes a transceiver configured to transmit a radar signal to the outside of the vehicle and receive a radar signal reflected from the object; a driving environment detector configured to detect a driving environment of the vehicle based on an operation status of the vehicle; an object detector configured to detect the object based on the received radar signal; and a controller configured to determine whether or not a predetermined event occurs based on the driving environment of the vehicle or a result of the detection of the object, and control signal characteristics of the transmitted radar signal or the received radar signal when the predetermined event occurs.

15 Claims, 8 Drawing Sheets

FIG. 3

| | | MEDIUM DISTANCE ~ 301 | LONG DISTANCE ~ 302 |
|---|---|---|---|
| 310 | Antenna Structure | | |
| 311 | Bandwidth (MHz) | 500 MHz | 200 MHz |
| 312 | Max. Range (m) | 120 | 300 |
| 313 | Max. Velocity (kph) | 250 | 250 |
| 314 | FoV (deg) | ±45/±16 | ±45/±16 |
| 315 | Range Resolution (m) | 0.3 | 0.75 |
| 316 | Range Accuracy (m) | 0.1 | 0.375 |
| 317 | Velocity Resolution (Kph) | 0.4 | 0.4 |
| 318 | Velocity Accuracy (Kph) | 0.2 | 0.2 |
| 319 | Angle Resolution (deg) | Azimuth : < 2.0 deg @0deg / 2.8deg @40deg Elevation : 5.6 deg | Azimuth : < 2.0 deg @0deg / 2.8deg @40deg Elevation : 5.6 deg |
| 320 | Angle Accuracy (deg) | 0.5 | 0.5 |
| 321 | Cycle Time (ms) | 67 | 67 |

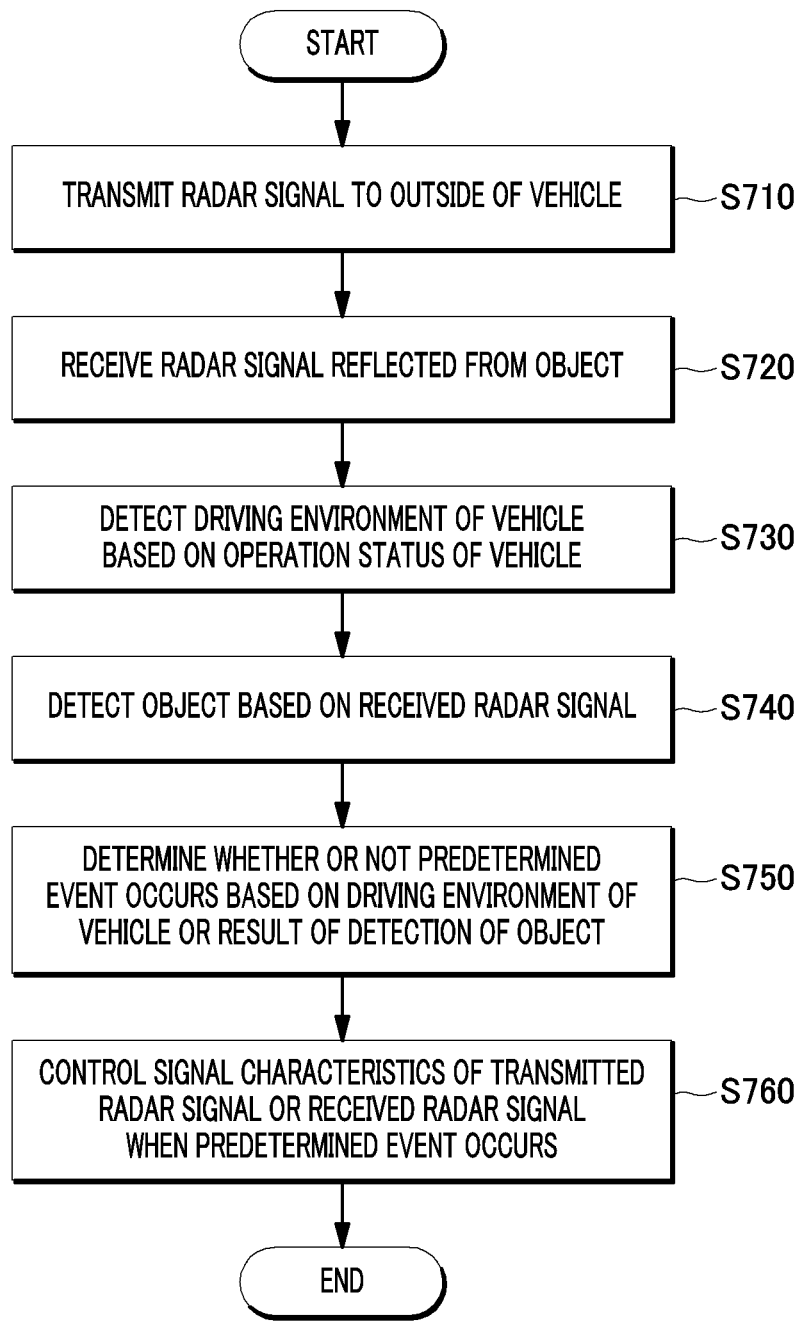

RADAR APPARATUS AND METHOD FOR DETECTING OBJECT BASED ON OCCURRENCE OF EVENT

CROSS-REFERENCE TO RELATED APPLICATION

This application claims the benefit under 35 USC 119(a) of Korean Patent Application No. 10-2020-0184951 filed on 28 Dec. 2020, in the Korean Intellectual Property Office, the entire disclosures of which are incorporated herein by reference for all purposes.

TECHNICAL FIELD

The present disclosure relates to a radar apparatus and method for detecting an object based on the occurrence of an event.

BACKGROUND

An automotive radar functions to provide a driver with position information of nearby vehicles and obstacles present in front, beside and behind the driver's vehicle. Also, the automotive radar may be installed in an autonomous vehicle and used to control the vehicle to perform autonomous driving and support safe driving.

In regard to this automotive radar, Korean Patent No. 10-0951529 discloses a method for driving an ultra-wideband radar system for vehicle and an ultra-wideband radar system for vehicle.

Hereinafter, a conventional automotive radar will be described with reference to FIG. 1A to FIG. 1C.

Referring to FIG. 1A, a conventional automotive radar may detect an object by transmitting radar signals from a vehicle 100 to a first detection range 110 covering a narrow and long area and a second detection range 120 covering a wide and short area. Each of the first detection range 110 and the second detection range 120 has a fixed maximum detection range and angle, and the conventional automotive radar transmits radar signals alternately to the first detection range 110 and the second detection range 120 at a regular time interval.

If the conventional automotive radar is a fast-chirp frequency-modulated continuous wave (FMCW) radar which is greatly improved in range resolution compared with a general FMCW radar, the maximum detection range is determined based on the range resolution determined by the bandwidth of the radar signal transmitted from the FMCW radar and the number of samples for the radar signal to be received through an analog-digital converter (ADC) included in the FMCW radar based on a single chirp.

That is, the maximum detection range $R_{max}$ is equal to $\Delta R \cdot N_R$ and determined based on $\Delta R = C/2B$ (herein, C represents the speed of light, B represents the bandwidth, $\Delta R$ represents the range resolution and $N_R$ represents the number of samples).

However, if $N_R$ is constant, the conventional automotive radar is limited in the maximum detection range for a fixed range resolution. If $N_R$ is increased to overcome this, the maximum detection range can be increased while maintaining the range resolution, but the memory usage is increased.

Also, referring to a waveform graph showing frequencies 131 over time 130 in FIG. 1B, if $N_R$ is increased, $\Delta T$ 132 increases, and as $\Delta T$ 132 increases, the maximum unambiguous velocity of an object to be detected using a radar signal decreases. Further, if $\Delta T$ 132 increases, a cycle time increases as a waveform transmitting time 133 increases.

Recently, an automotive radar has been equipped with an imaging radar configured to perform spatial imaging. However, if a fixed maximum detection range and angle is applied to the imaging radar requiring high resolution, it is impossible to detect an object at a long distance with high range resolution.

Referring to FIG. 1C, the imaging radar employs a multi-input multi-output (MIMO) scheme using a plurality of transmitter antennas (Tx) 140 to increase the angle resolution. However, the MIMO scheme has a low maximum unambiguous velocity, which makes it difficult to detect an object having a high relative speed.

Accordingly, when detecting an object having a high relative speed, the imaging radar is subjected to a decrease in detection probability.

SUMMARY

In view of the foregoing, the present disclosure provides an object detection radar apparatus and method capable of transmitting a radar signal to the outside of a vehicle, receiving a radar signal reflected from an object, detecting a driving environment of the vehicle based on an operation status of the vehicle and detecting the object based on the received radar signal.

The present disclosure provides an object detection radar apparatus and method capable of determining whether or not a predetermined event occurs based the driving environment of the vehicle or a result of the detection of the object and controlling signal characteristics of the transmitted radar signal or the received radar signal when the predetermined event occurs.

The problems to be solved by the present disclosure are not limited to the above-described problems. There may be other problems to be solved by the present disclosure.

According to an exemplary embodiment, an object detection radar apparatus that is installed in a vehicle and configured to detect an object may include a transceiver configured to transmit a radar signal to the outside of the vehicle and receive a radar signal reflected from the object; a driving environment detector configured to detect a driving environment of the vehicle based on an operation status of the vehicle; an object detector configured to detect the object based on the received radar signal; and a controller configured to: determine whether or not a predetermined event occurs based on the driving environment of the vehicle or a result of the detection of the object, and control signal characteristics of the transmitted radar signal or the received radar signal when the predetermined event occurs.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described embodiments of the present disclosure, it is possible to possible to provide an object detection radar apparatus and method capable of transmitting a radar signal to the outside of a vehicle, receiving a radar signal reflected from an object to detect the object, determining whether or not a predetermined event, such as preceding car following event or preceding car absence event, occurs based the driving environment of the vehicle or a result of the detection of the object and controlling signal characteristics of the transmitted radar signal or the received radar signal when the predetermined event occurs.

It is possible to possible to provide an object detection radar apparatus and method capable of detecting a driving environment of a vehicle based on an operation status of the vehicle, determining whether or not a predetermined event, such as curve driving of the vehicle, occurs based on the detected driving environment of the vehicle and controlling signal characteristics of a radar signal when the predetermined event occurs.

The imaging radar has required a lot of hardware resources to provide a specification optimal for every case. However, according to any one of the above-described embodiments of the present disclosure, it is possible to provide an object detection radar apparatus and method capable of reducing hardware resources to be consumed by changing a specification for each case.

It is possible to possible to provide an object detection radar apparatus and method capable of improving the performance of a radar sensor for each case using limited resources.

It is possible to possible to provide an object detection radar apparatus and method capable of reflecting the requirements for an optimal radar sensor so as to be applicable to an autonomous vehicle.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3 is an example depiction illustrating a medium-distance mode and a long-distance mode in accordance with an embodiment of the present disclosure.

FIG. 7 is a flowchart showing a method for detecting an object by the object detection radar apparatus in accordance with an embodiment of the present disclosure.

DETAILED DESCRIPTION

Figure 1A:
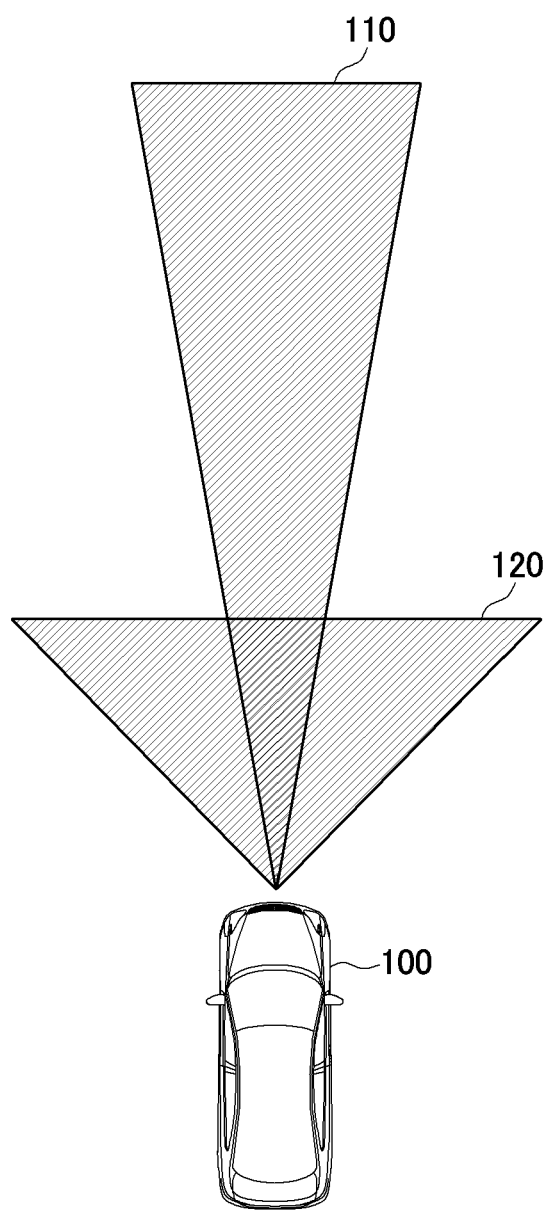
FIG. 1A is a depiction to explain a process of detecting an object using a conventional automotive radar.
Figure 1B:
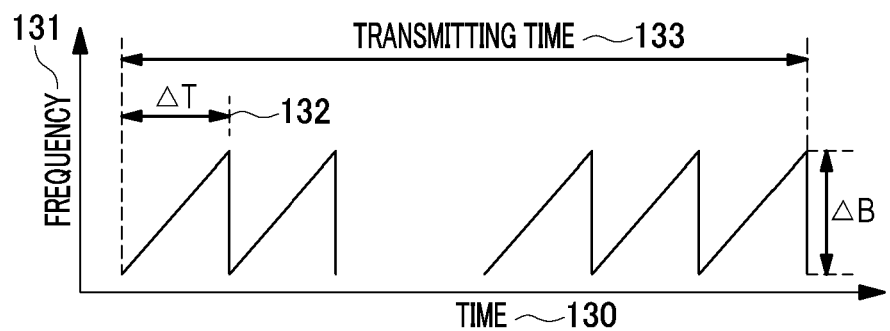
FIG. 1B is a depiction to explain a process of detecting an object using a conventional automotive radar.
Figure 1C:
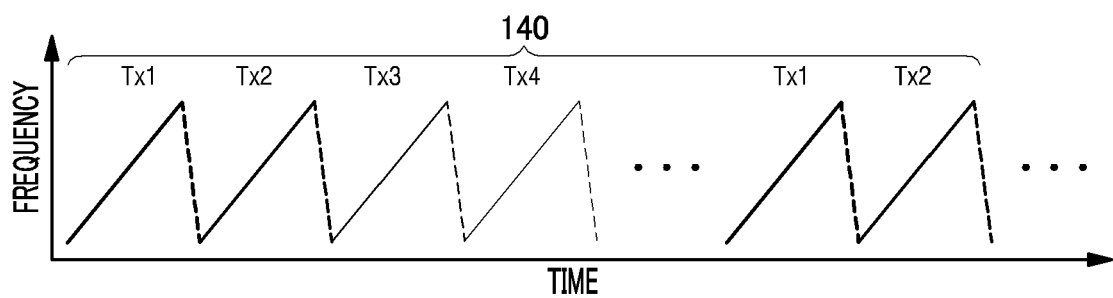
FIG. 1C is a depiction to explain a process of detecting an object using a conventional automotive radar.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, the present disclosure will be explained in detail with reference to the accompanying configuration views or process flowcharts.

Figure 2:
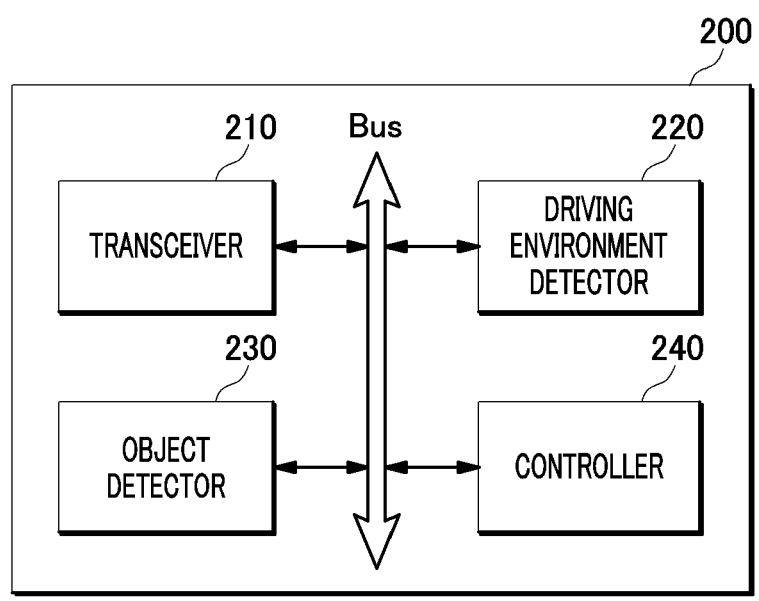
FIG. 2 is a block diagram illustrating the configuration of an object detection radar apparatus in accordance with an embodiment of the present disclosure.

FIG. 2 is a block diagram illustrating the configuration of an object detection radar apparatus in accordance with an embodiment of the present disclosure. Referring to FIG. 2, an object detection radar apparatus 200 may include a transceiver 210, a driving environment detector 220, an object detector 230 and a controller 240. Herein, the object detection radar apparatus 200 according to the present disclosure may include an imaging radar. The term "imaging radar" refers to a radar configured to transmit microwaves to an object (target), acquire reflection waves reflected and returning from the object (target) in sequence depending on the distance and acquire information about the presence and shape of the object. The imaging radar may be installed on the roof, number plate, bumper or front mirror of a vehicle.

The transceiver 210 may transmit a radar signal to the outside of a vehicle and receive a radar signal reflected from an object. For example, the transceiver 210 may transmit a medium- and long-distance range radar signal to the outside of the vehicle.

For example, the transceiver 210 may transmit a radar signal to a medium-distance range corresponding to a medium-distance mode so as to reach a distance of, for example, 120 meters (m) from the vehicle. Also, the transceiver 210 may transmit a radar signal to a long-distance range corresponding to a long-distance mode so as to reach a distance of, for example, 300 m from the vehicle. Here, the medium-distance mode and the long-distance mode may be in an activation state even without an activation trigger from when the vehicle starts driving on the road until the vehicle stops driving.

The medium-distance mode and the long-distance mode will be described in detail with reference to FIG. 3.

FIG. 3 is an example depiction illustrating a medium-distance mode and a long-distance mode in accordance with an embodiment of the present disclosure. Referring to FIG. 3, a detection range in a medium-distance mode 301 may include a medium-distance range and a detection range in a long-distance mode 302 may include a long-distance range.

An antenna structure 310 in the medium-distance mode 301 and the long-distance mode 302 may include a plurality of transmitter antennas Tx arranged at regular horizontal and vertical intervals in a diagonal direction and a plurality of receiver antennas Rx arranged in parallel with each other in a horizontal direction based on an azimuth axis of a driving direction of the vehicle.

For example, a bandwidth 311 may be 500 MHz for the medium-distance mode 301 and 200 MHz for the long-distance mode 302.

For example, a max range (equal to maximum detection range) 312 may be 120 m for the medium-distance mode 301 and 300 m for the long-distance mode 302.

For example, a max velocity 313 of an object to be detected using a radar signal in the medium- and long-distance modes 301 and 302 may be 250 kilometers per hour (kph), and a field of view (FoV) 314 for the medium- and long-distance modes 301 and 302 may be ±45/±16 deg.

For example, a range resolution 315 may be 0.3 m for the medium-distance mode 301 and 0.75 m for the long-distance mode 302.

For example, a range accuracy 316 may be 0.1 m for the medium-distance mode 301 and 0.375 m for the long-distance mode 302.

For example, the medium- and long-distance modes 301 and 302 may have a velocity resolution 317 of 0.4 kph and a velocity accuracy 318 of 0.2 kph.

For example, the medium- and long-distance modes 301 and 302 may have an angle resolution 319 including an azimuth angle of 2.8 deg or less and an elevation angle of 5.6 deg, an angle accuracy 320 of 0.5 deg and a cycle time of 67 milliseconds (ms).

Here, the medium-distance mode 301 and the long-distance mode 302 may be performed alternately based on a cycle time 321. For example, if the cycle time is 67 ms, the medium-distance mode 301 and the long-distance mode 302 may be performed alternately at an interval of 67 ms.

Referring to FIG. 2 again, the driving environment detector 220 may detect a driving environment of the vehicle based on an operation status of the vehicle. Here, the operation status of the vehicle may refer to the status for driving forward and backward, turning left and right or the like depending on, for example, a steering angle or a yaw rate of the vehicle.

The object detector 230 may detect the object based on the received radar signal. For example, the object detector 230 may detect an object related to a nearby vehicle, obstacle or person located in the vicinity of the vehicle based on the received radar signal.

The controller 240 may determine whether or not a predetermined event occurs based on the driving environment of the vehicle or a result of the detection of the object and control signal characteristics of the transmitted radar signal or the received radar signal when the predetermined event occurs. The process of controlling signal characteristics of the transmitted radar signal or the received radar signal based on whether or not the predetermined event occurs will be described in detail with reference to FIG. 4 to FIG. 6.

Figure 4:
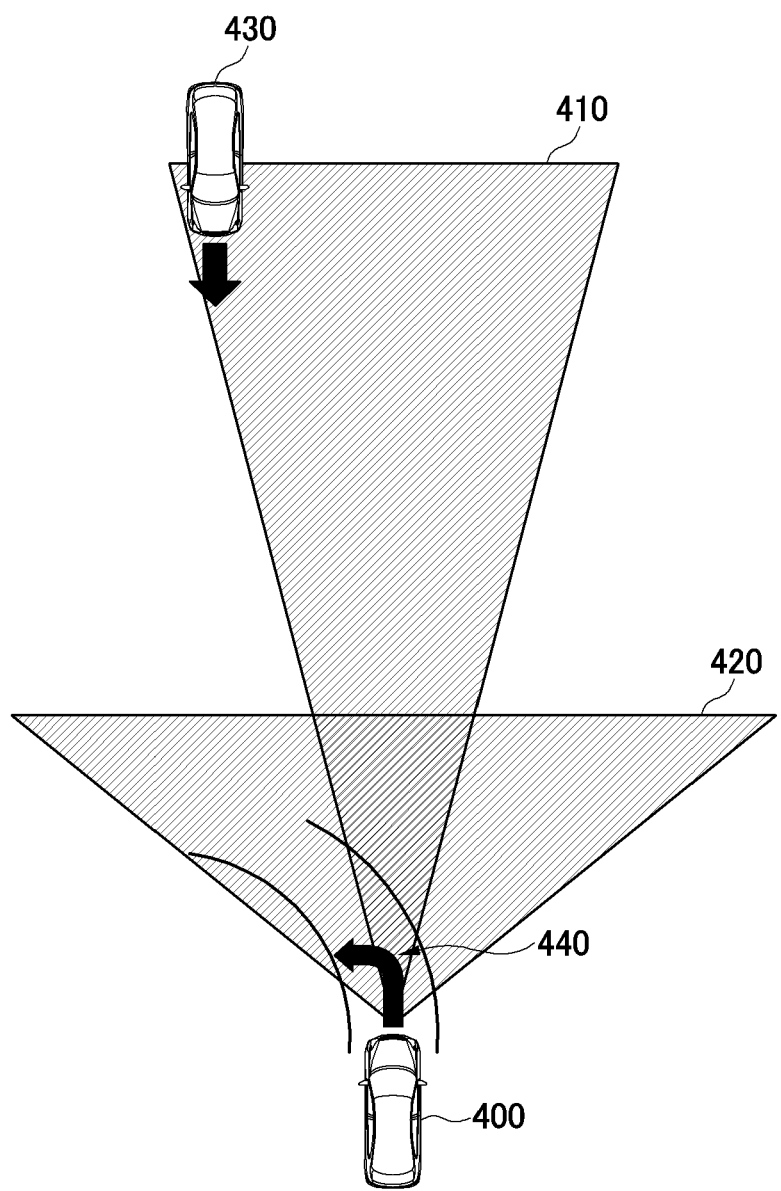
FIG. 4 is an example depiction to explain a process of determining whether or not a predetermined event, such as curve driving of a vehicle, occurs in accordance with an embodiment of the present disclosure.

FIG. 4 is an example depiction to explain a process of determining whether or not a predetermined event, such as curve driving of a vehicle, occurs in accordance with an embodiment of the present disclosure. Referring to FIG. 4, the driving environment detector 220 may detect a steering angle or a yaw rate of a vehicle 400 and detect a driving environment of the vehicle 400 based on the detected steering angle or yaw rate of the vehicle 400. Herein, the steering angle refers to the angle for steering wheels of the vehicle 400 depending on the degree of rotation of a handle of the vehicle 400, and the yaw rate refers to the rate of change in rotation angle (yaw angle) around the vertical line passing through the center of the vehicle 400.

The controller 240 may determine whether or not the predetermined event, such as curve driving 440 of the vehicle 400, occurs based on the detected steering angle or yaw rate of the vehicle 400. Here, the reason for determining whether or not the curve driving 440 occurs is that when the vehicle 400 turns left at an intersection based on path planning, such as turning left, turning right and U-turn, during autonomous driving, it is very important to detect a nearby vehicle 430 approaching on the opposite lane.

When the curve driving 440 of the vehicle 400 occurs, the controller 240 may control the bandwidth of the transmitted radar signal. For example, the controller 240 may reduce the range resolution by reducing the bandwidth of the transmitted radar signal. Thus, the object detector 230 may increase the maximum detection range by controlling the bandwidth of the transmitted radar signal.

For example, the transceiver 210 may increase the maximum detection range for the medium-distance mode and the long-distance mode by reducing the bandwidth of a radar signal to be transmitted to a detection range 420 in the medium-distance mode and a detection range 410 in the long-distance mode.

When the curve driving 440 of the vehicle 400 occurs, the controller 240 may control the number of transmitter antennas connected to the transceiver 210 and used for MIMO operation. The term "MIMO" refers to a technique using a plurality of antennas for increasing the transmission capacity of a radar signal in proportion to the number of antennas.

For example, the controller 240 may reduce the number of transmitter antennas Tx used for MIMO operation. The object detector 230 may increase the maximum unambiguous velocity of an object to be detected using a radar signal by controlling the number of transmitter antennas.

Figure 5:
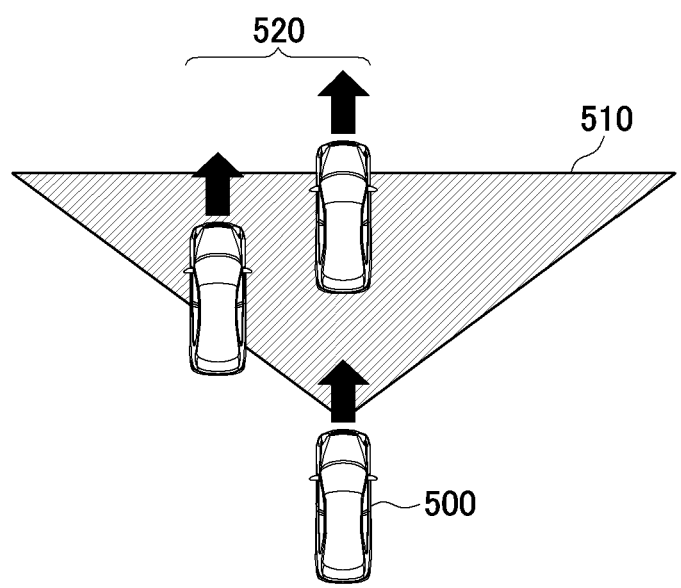
FIG. 5 is an example depiction to explain a process of determining whether or not a predetermined event, such as preceding car following event, occurs in accordance with an embodiment of the present disclosure.

FIG. 5 is an example depiction to explain a process of determining whether or not a predetermined event, such as preceding car following event, occurs in accordance with an embodiment of the present disclosure. Referring to FIG. 5, the object detector 230 may detect information about the distance to an object located in front of a vehicle 500, the speed (including the relative speed and the absolute velocity) of the vehicle 500 and a headway time of the vehicle 500. The headway time may refer to the driver's response time in various environments. Here, the object detector 230 may detect information about the distance to an object, the speed of the vehicle 500 and a headway time of the vehicle 500 in consideration of the current position of the vehicle 500 (for example, at an intersection, tunnel or the like).

The controller 240 may determine whether or not a predetermined event, such as tracking of a preceding vehicle 520, occurs based on the detected information.

When the preceding car following event occurs, the controller 240 may control the number of samples $N_R$ for the received radar signal. For example, when the preceding car following event occurs, the controller 240 may reduce the number of samples $N_R$ for the received radar signal. The object detector 230 may reduce a maximum detection range 510 for the medium-distance mode and the long-distance mode and the cycle time of the transmitted radar signal for the medium-distance mode and the long-distance mode by controlling the number of samples.

Accordingly, the maximum detection range 510 and the cycle time of a radar signal can be reduced by controlling the number of samples for the received radar signal based on the occurrence of preceding car following event. Therefore, it is possible to quickly detect the preceding vehicle 520 and thus possible to quickly perform an emergency collision avoidance such as autonomous emergency braking (AEB).

Figure 6:
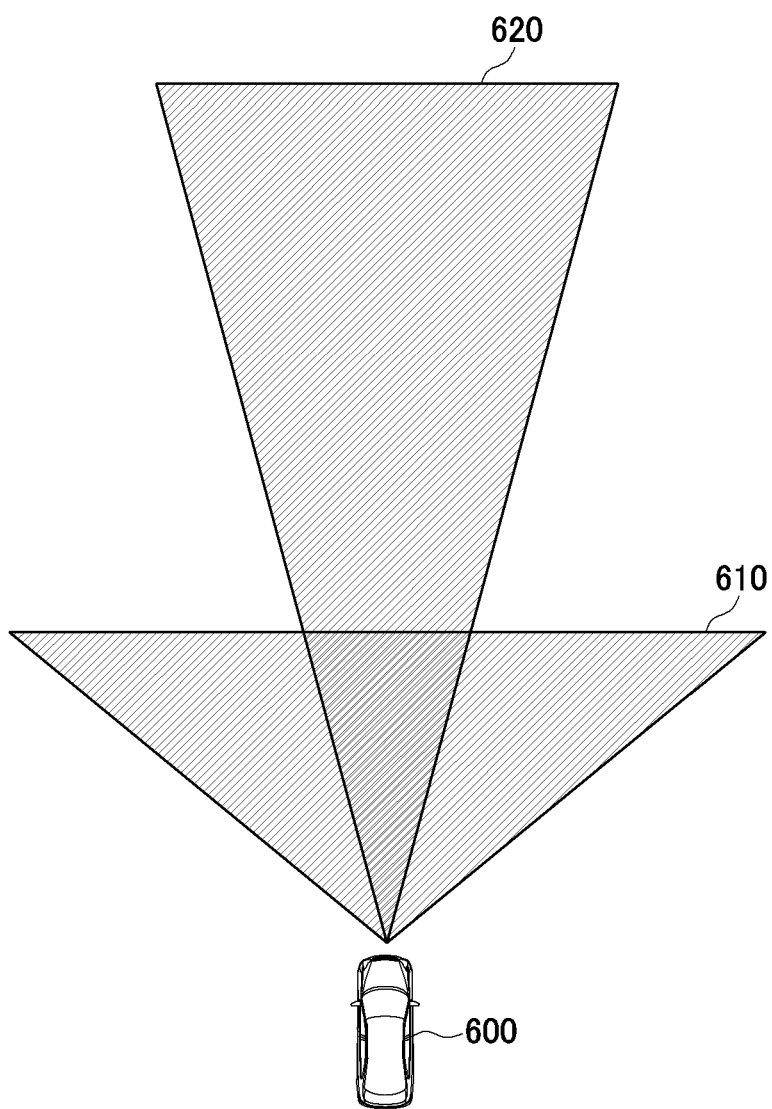
FIG. 6 is an example depiction to explain a process of determining whether or not a predetermined event, such as preceding car absence event, occurs in accordance with an embodiment of the present disclosure.

FIG. 6 is an example depiction to explain a process of determining whether or not a predetermined event, such as preceding car absence event, occurs in accordance with an embodiment of the present disclosure. Referring to FIG. 6, the object detector 230 may detect information about the distance to an object located in front of a vehicle 600, the speed of the vehicle 600 and a headway time of the vehicle 600.

The controller 240 may determine whether or not a predetermined event, such as preceding car absence event, occurs based on the detected information.

When the preceding car absence event occurs, the controller 240 may control the number of samples for the received radar signal or the bandwidth of the transmitted radar signal. Also, the controller 240 may control the bandwidth of the transmitted radar signal based on the driving speed of the vehicle 600. The object detector 230 may increase the maximum detection range by controlling the number of samples for the received radar signal or the bandwidth of the transmitted radar signal.

For example, when the preceding car absence event occurs (i.e., there is no vehicle detected within a detection range 610 in the medium-distance mode and a detection range 610 in the long-distance mode), the controller 240 may reduce the range resolution to reduce the bandwidth of a radar signal to be transmitted or increase the number of samples for the received radar signal to increase the maximum detection range for the medium-distance mode and the long-distance mode in a driving direction of the vehicle 600.

When the preceding car absence event occurs, the controller 240 may control the number of transmitter antennas connected to the transceiver 210 and used for MIMO operation. For example, the controller 240 may reduce the number of transmitter antennas Tx used for MIMO operation. The object detector 230 may increase the maximum unambiguous velocity of an object to be detected using a radar signal by controlling the number of transmitter antennas connected to the transceiver.

The controller 240 may control the number of transmitter antennas based on the driving speed of a vehicle. For example, the controller 240 may reduce the bandwidth of a radar signal to be transmitted and the number of transmitter antennas Tx used for MIMO operation as the driving speed of the vehicle 600 increases. Thus, the controller 240 may increase the maximum detection range for the medium-distance mode and the long-distance mode. The object detector 230 may increase the maximum unambiguous velocity of an object to be detected using a radar signal by controlling the number of transmitter antennas connected to the transceiver.

FIG. 7 is a flowchart showing a method for detecting an object by the object detection radar apparatus in accordance with an embodiment of the present disclosure. The method for detecting an object by the object detection radar apparatus 200 illustrated in FIG. 7 includes the processes time-sequentially performed by the object detection radar apparatus 200 according to the embodiment illustrated in FIG. 2 to FIG. 6. Therefore, descriptions of the processes performed by the object detection radar apparatus 200 may also be applied to the method for detecting an object by the object detection radar apparatus 200, even though they are omitted hereinafter.

In a process 5710, the object detection radar apparatus 200 may transmit a radar signal to the outside of a vehicle.

In a process 5720, the object detection radar apparatus 200 may receive a radar signal reflected from an object.

In a process 5730, the object detection radar apparatus 200 may detect a driving environment of the vehicle based on an operation status of the vehicle.

In a process 5740, the object detection radar apparatus 200 may detect the object based on the received radar signal.

In a process 5750, the object detection radar apparatus 200 may determine whether or not a predetermined event occurs based on the driving environment of the vehicle or a result of the detection of the object.

In a process 5760, the object detection radar apparatus 200 may control signal characteristics of the transmitted radar signal or the received radar signal when the predetermined event occurs.

In the descriptions above, the processes 5710 to 5760 may be divided into additional processes or combined into fewer processes depending on an embodiment. In addition, some of the processes may be omitted and the sequence of the processes may be changed if necessary.

The method for detecting an object by the object detection radar apparatus illustrated in FIG. 2 to FIG. 7 can be implemented as a computer program stored in a medium to be executed by a computer or a storage medium including instructions codes executable by a computer. Also, the method for detecting an object by the object detection radar apparatus illustrated in FIG. 2 to FIG. 6 can be implemented as a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. An object detection radar apparatus that is installed in a vehicle and configured to detect an object, comprising:
   a transceiver configured to transmit a radar signal to an outside of the vehicle and receive a radar signal reflected from the object;
   a driving environment detector configured to detect a driving environment of the vehicle based on an operation status of the vehicle;
   an object detector configured to detect the object based on the received radar signal; and
   a controller configured to:
   determine whether or not a preceding car following event or a preceding car absence event occurs based on the driving environment of the vehicle or a result of the detection of the object,
   reduce a number of samples for the received radar signal in response to determining that the preceding car following event occurs, and
   increase the number of samples for the received radar signal in response to determining that the preceding car absence event occurs,
   wherein the controller controls a bandwidth of the transmitted radar signal based on a driving speed of the vehicle.

2. The object detection radar apparatus of claim 1, wherein the driving environment detector detects a steering angle or a yaw rate of the vehicle, and
   the controller determines whether or not curve driving of the vehicle occurs based on the detected steering angle or yaw rate of the vehicle.

3. The object detection radar apparatus of claim 2, wherein when the curve driving of the vehicle occurs, the controller controls the bandwidth of the transmitted radar signal.

4. The object detection radar apparatus of claim 3, wherein the object detector decreases the bandwidth of the transmitted radar signal in response to determining that the curve driving of the vehicle occurs.

5. The object detection radar apparatus of claim 2, wherein when the curve driving of the vehicle occurs, the controller controls a number of transmitter antennas connected to the transceiver and used for multi-input multi-output (MIMO) operation.

6. The object detection radar apparatus of claim 5, wherein the object detector decreases the number of transmitter antennas in response to determining that the curve driving of the vehicle occurs.

7. The object detection radar apparatus of claim 1, wherein the object detector detects at least one of information about a distance to an object located in front of the vehicle, a speed of the vehicle and a headway time of the vehicle, and
   the controller determines whether or not a preceding car following event occurs based on the detected information.

8. The object detection radar apparatus of claim 7, wherein when the preceding car following event occurs, the controller controls a number of samples for the received radar signal.

9. The object detection radar apparatus of claim 1, wherein the object detector detects at least one of information about a distance to an object located in front of the vehicle, a speed of the vehicle and a headway time of the vehicle, and
   the controller determines whether or not a preceding car absence event occurs based on the detected information.

10. The object detection radar apparatus of claim 9, wherein the object detector decreases a bandwidth of the transmitted radar signal in response to determining that the preceding car absence event occurs.

11. An object detection radar apparatus that is installed in a vehicle and configured to detect an object, comprising:
    a transceiver configured to transmit a radar signal to an outside of the vehicle and receive a radar signal reflected from the object;
    a driving environment detector configured to detect a driving environment of the vehicle based on an operation status of the vehicle;
    an object detector configured to detect the object based on the received radar signal; and
    a controller configured to:
    determine whether or not a predetermined event occurs based on the driving environment of the vehicle or a result of the detection of the object, and
    control signal characteristics of the transmitted radar signal or the received radar signal when the predetermined event occurs,
    wherein the object detector detects at least one of information about a distance to an object located in front of the vehicle, a speed of the vehicle and a headway time of the vehicle, and
    the controller determines whether or not a preceding car absence event occurs based on the detected information,
    wherein when the preceding car absence event occurs, the controller controls a number of samples for the received radar signal or a bandwidth of the transmitted radar signal, and
    wherein the controller controls the bandwidth of the transmitted radar signal based on a driving speed of the vehicle.

12. An object detection radar apparatus that is installed in a vehicle and configured to detect an object, comprising:
    a transceiver configured to transmit a radar signal to an outside of the vehicle and receive a radar signal reflected from the object;
    a driving environment detector configured to detect a driving environment of the vehicle based on an operation status of the vehicle;
    an object detector configured to detect the object based on the received radar signal; and
    a controller configured to:
    determine whether or not a predetermined event occurs based on the driving environment of the vehicle or a result of the detection of the object, and
    control signal characteristics of the transmitted radar signal or the received radar signal when the predetermined event occurs,
    wherein the object detector detects at least one of information about a distance to an object located in front of the vehicle, a speed of the vehicle and a headway time of the vehicle, and
    the controller determines whether or not a preceding car absence event occurs based on the detected information, and wherein when the preceding car absence event occurs, the controller controls a number of transmitter antennas connected to the transceiver and used for MIMO operation.

13. The object detection radar apparatus of claim 12, wherein the controller controls the number of transmitter antennas based on the driving speed of the vehicle.

14. The object detection radar apparatus of claim 12, wherein the object detector increases a maximum unambiguous velocity by controlling the number of transmitter antennas connected to the transceiver.

15. An object detection method for detecting an object, comprising:
   transmitting a radar signal to the outside of a vehicle;
   receiving a radar signal reflected from the object;
   detecting a driving environment of the vehicle based on an operation status of the vehicle;
   detecting the object based on the received radar signal;
   determining whether or not a preceding car following event or a preceding car absence event occurs based on the driving environment of the vehicle or a result of the detection of the object;
   reducing a number of samples for the received radar signal in response to determining that the preceding car following event occurs;
   increasing the number of samples for the received radar signal in response to determining that the preceding car absence event occurs; and
   controlling a bandwidth of the transmitted radar signal based on a driving speed of the vehicle.

* * * * *